United States Patent
Bunkers

Patent Number: 5,095,646
Date of Patent: Mar. 17, 1992

[54] BIRD EXTERMINATION DEVICE

[76] Inventor: Kenneth C. Bunkers, 112 W. 10th St., Dell Rapids, S. Dak. 57022

[21] Appl. No.: 659,094

[22] Filed: Feb. 22, 1991

[51] Int. Cl.$^5$ .............................................. A01M 19/00
[52] U.S. Cl. ............................................ 43/98; 43/112; 43/124; 361/232
[58] Field of Search ..................... 43/98, 112; 361/232

[56] References Cited

U.S. PATENT DOCUMENTS

| | | | |
|---|---|---|---|
| 2,647,228 | 7/1953 | Just | 43/112 |
| 3,294,893 | 12/1966 | Shaffer | 361/232 X |
| 3,366,854 | 1/1968 | Robinson | 317/262 |
| 3,717,802 | 2/1973 | Plevy | 361/232 |
| 3,747,897 | 7/1973 | Conley | 256/10 |
| 4,299,048 | 11/1981 | Bayes | 361/232 X |
| 4,862,637 | 9/1989 | Dressel | 361/232 X |

Primary Examiner—Richard K. Seidel
Assistant Examiner—Patty E. Hong

[57] ABSTRACT

A portable electrical device for keeping birds from a specific place. The device comprises a pair of parallel wires entrained on a swinging block. The wires carry a voltage potentially lethal to birds and bracket a trough formed in the block and adapted to a hold a bait.

7 Claims, 1 Drawing Sheet

BIRD EXTERMINATION DEVICE

BACKGROUND AND SUMMARY OF THE INVENTION

This invention pertains to a portable device for deterring the gathering of birds in specific locations and more particularly to such a device adapted to attract and destroy birds which have entered a restricted area.

While bird life in its place may be attractive and of positive benefit, there are locales where similar birds may be destructive or at least undesirable. For example, in such buildings as grain storage buildings bird droppings can damage considerable grain. In buildings for the storage of machinery such as farm machinery or small aircraft, the droppings while not totally destructive are certainly undesirable.

Devices such as whistles, fake animals, scarecrows and the like have commonly been used in an attempt to frighten birds from an area. Electrically charged fences have also been used to enclose livestock pens, but those require a charged fence and contact with the earth beneath the fence to complete the circuit. At least one device has proposed parallel wires on a fence, having the wires spaced apart by insulators. All of the devices re designed principally for outdoor use and rely on random alighting or incidental presence of birds.

By my invention, I provide a device which is portable and designed particularly for indoor use. I also include provision for the use of grain or other bird feed to attract birds within the building so that they may be destroyed.

DESCRIPTION

Figure 2:
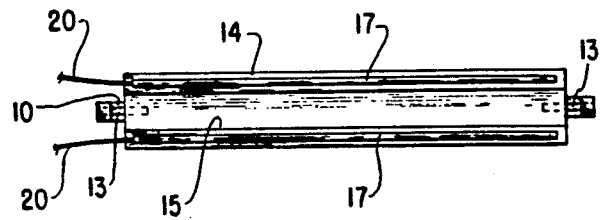
FIG. 2 is a top view of the device of FIG. 1.
Figure 3:
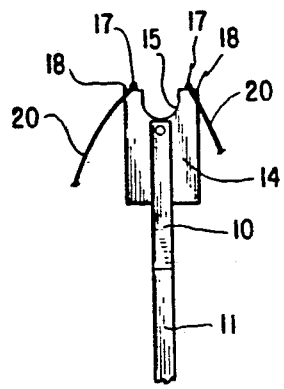
FIG. 3 is an end elevational view of the device.
Figure 1:
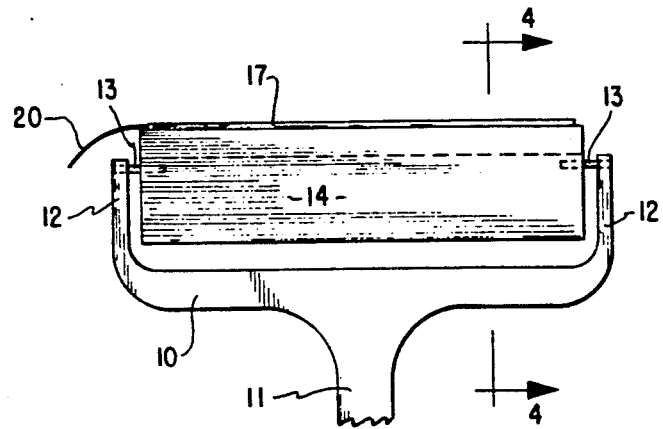
FIG. 1 is an elevational view of an embodiment of my device.
Figure 4:
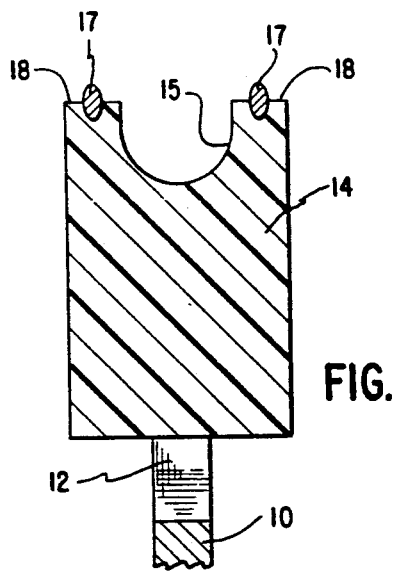
FIG. 4 is a sectional view from line 4—4 of FIG. 1 and to an enlarged scale.

Briefly, my device comprises a portable device adapted for mounting on either a vertical or horizontal mount, having parallel electric wires for the electrocution of unwanted birds. Provision is made for use of grain as bait to lure the birds.

More specifically and referring to the drawings the device is mounted on a yoke 10 which may have a stem 11. Together the yoke 10 and stem 11 form a holder. The stem may be adapted to mount on a post or from a wall depending on the preferred location of the device. As illustrated, the yoke 10 has a relatively short span. It will be recognized that this span can be greatly lengthened without departing from the basic concept of the device.

Between the arms 12 of the yoke 10 mounted on pivotal axis 13 is a roost block 14 which may be made of wood or, preferably of some insulating plastic material. The mounting of the block on pivotal axis allows the yoke to be mounted vertically or at a slant so long as the pivotal axis remains substantially horizontal. Thus, the stem could be mounted on a stand of its own on the floor of a building, on a post, or attached to an exposed studding or rafter whichever is most convenient or appropriate.

The block 14 is found to provide a longitudinal trough 15 which, though relatively narrow, can be used to hold grain or seed attractive to the particular birds which are creating the problems. These may be starlings, pigeons or other pest birds, the feeding habits of which may be well known.

A pair of bare contact wires 17 is fixed to the block 14 on the edges 18 of the trough. These wires may be circular or preferably oval in cross section and are glued to the edges 18 or, as illustrated may be partially embedded in the material of the block. Lead wires 20 are used to connect the contact wires 17 to a source of electrical energy.

To use the device, the stem 11 is first attached to a convenient support in the general location frequented by the bird pests. The block 14 is swung (or allowed to swing if it is freely swinging) so that the trough 15 is on the upward edge of the block 14. Grain or bird seed of a type generally eaten by the particular type of pest bird is placed in the trough. The wires 17 are then charged either by connecting the device to an available power source, throwing a switch or actuating a converter with power from a battery. As the bird settles on the block 14 to get at the food in the trough 15, either if one foot touches both wires 17 or if the bird straddles the trough with one foot touching each wire at the same time, the electricity will suddenly electrocute the bird and destroy it.

I claim as my invention:

1. A bird electrocution device comprising a holder, block means pivotally mounted on said holder, said pivotal mounting being along a longitudinal pivot axis whereby said block means pivots back and forth about said longitudinal axis, contact wire means mounted in parallel relationship on said block means, said wire means being adapted to be electrically charged from an outside source.

2. The device of claim 1 in which said holder includes a yoke, said block means lying between arms of said yoke and being pivotally connected thereto at each end of said block means.

3. The device of claim 1 in which said block means provides a trough between said wires adapted to receive material for attracting birds.

4. The device of claim 3 in which said contact wire means includes wires partially embedded in said block means but extending above the surface of said block means.

5. The device of claim 4 in which said wires are of oval cross section and are embedded so that a major diameter of said oval extends perpendicular to the surface in which the wire is embedded.

6. The device of claim 2 in which said yoke includes a stem, said stem being adapted for mounting the device.

7. The device of claim 6 in which said block means is formed to provide a trough between said wires, said trough being adapted to receive material to attract birds.

* * * * *